United States Patent
Karaiwa

(10) Patent No.: US 6,866,939 B1
(45) Date of Patent: Mar. 15, 2005

(54) THERMOPLASTIC ELASTOMER LAMINATED MATERIAL

(75) Inventor: Masato Karaiwa, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 140 days.

(21) Appl. No.: 09/649,092

(22) Filed: Aug. 28, 2000

(30) Foreign Application Priority Data

Sep. 3, 1999 (JP) .......................................... 11-249957

(51) Int. Cl.$^7$ .............................................. B32B 27/08
(52) U.S. Cl. ...................... 428/515; 428/516; 428/517; 428/519; 428/521
(58) Field of Search ................................ 428/515, 516, 428/517, 521, 519

(56) References Cited

U.S. PATENT DOCUMENTS

| | | | |
|---|---|---|---|
| 5,314,752 A | 5/1994 | Bova et al. | 428/424.2 |
| 5,362,572 A | * 11/1994 | Hamada et al. | 428/497 |
| 5,702,827 A | * 12/1997 | Itoh et al. | 428/519 |
| 5,766,703 A | * 6/1998 | Mori et al. | 428/31 |

FOREIGN PATENT DOCUMENTS

| | | | |
|---|---|---|---|
| EP | 0-472268 A2 | 2/1992 | C08J/5/12 |
| EP | 0-860314 A1 | 8/1998 | |
| JP | 1-210338 | 8/1989 | B32B/25/08 |
| JP | 6-182951 | 7/1994 | B32B/27/32 |

OTHER PUBLICATIONS

Fundamental Principles of Polymeric Materials, $2^{nd}$ Edition, Stephen L. Rosen, John Wiley & Sons, Inc., pp. 2 and 389–390, 1993.*

* cited by examiner

*Primary Examiner*—Monique R. Jackson
(74) *Attorney, Agent, or Firm*—Sherman & Shalloway

(57) ABSTRACT

The present invention relates to a laminated material characterized in that, in the laminated material wherein a polyolefinic thermoplastic elastomer(B) containing an oily softening agent is laminated on the surface layer comprising a polyolefinic thermoplastic elastomer(A) containing an oily softening agent, the ratio(a) of the oily softening agent to the amorphous component(or to the total of the amorphous component and polyethylene if polyethylene is incorporated) in the thermoplastic elastomer(A) and the ratio(b) of the oily softening agent to the amorphous component(or to the total of the amorphous component and polyethylene if polyethylene is incorpirated) in the thermoplastic elastomer(B) satisfy the following requisites;

ratio(a)$\geq$ratio(b), ratio(a)=5 to 200 wt. %, and ratio(b)=5 to 200 wt. %, and relates to a glass-run channel, and a roof molding, side molding and window molding for automobiles comprising the laminated material.

9 Claims, No Drawings

THERMOPLASTIC ELASTOMER LAMINATED MATERIAL

BACKGROUND OF THE INVENTION

The present invention relates to a laminated material formed by laminating a polyolefinic thermoplastic elastomer.

In recent years there is a move of abolishing the use of poly (vinyl chloride) from the viewpoint of its recyclability and the like. As a substitute for poly(vinyl chloride) a thermoplastic elastomer has been considered most favorable.

The thermoplastic elastomer, however, has drawbacks compared to poly(vinyl chloride) in that it lacks in luster, scratch resistance and the like, and, to solves the problems, trials are being made to provide luster and scratch resistance by blending a polyolefin resin, organopolysiloxane, etc. At that time, since the organopolysiloxane is expensive compared to the thermoplastic elastomer, there is considered a constitution in which the necessary surface layer is composed of a material blended with an organopolysiloxane and the underlayer is composed of a conventional thermoplastic elastomer.

When such a constitution is applied, for example, for roof moldings and window moldings of automobiles, the following limitation arises. The roof moldings are used for the roofs of automobiles and the window moldings are used for portions of the window glass, and these portions are exposed to the sunlight in the actual use of the automobiles and the surface temperature of the materials becomes high. Accordingly, these materials are required not to undergo any change in their appearance and slipperiness of the surface under, for example, 80° C. and 400 hours.

However, these laminated materials sometimes lost the surface slipperiness owing to the stickiness generated on the surface and besides showed appearance change after the test of 80° C. and 400 hours.

OBJECTS AND SUMMARY OF THE INVENTION

The technical object of the present invention is to provide a thermoplastic elastomer laminated material which undergoes no surface change and which is free from stickiness even when exposed to high temperatures.

The present invention includes the following inventions.

(1) A laminated material characterized in that, in the laminated material wherein a polyolefinic thermoplastic elastomer(B) containing an oily softening agent is laminated on the surface layer comprising a polyolefinic thermoplastic elastomer(A) containing an oily softening agent, the ratio(a) of the oily softening agent to the amorphous component (or to the total of the amorphous component and polyethylene if polyethylene is incorporated) in the thermoplastic elastomer (A) and the ratio(b) of the oily softening agent to the amorphous component(or to the total of the amorphous component and polyethylene if polyethylene is incorporated) in the thermoplastic elastomer(B) satisfy the following requisites;

ratio(a)≧ratio(b), ratio(a)=5 to 200 wt. %, and ratio(b) 5 to 200 wt. %.

(2) A laminated material characterized in that, in the laminated material according to the above (1), the polyolefinic thermoplastic elastomer(A) and/or the polyolefinic thermoplastic elastomer(B) contain(s) polyethylene and in addition the ratio(a') of the oily softening agent to the amorphous component in the thermoplastic elastomer(A) and the ratio(b') of the oily softening agent to the amorphous component in the thermoplastic elastomer(B) satisfy the following requisites;

ratio(a')≧0.8×ratio(b'), ratio(a')=5 to 200 wt. %, and ratio(b')=5 to 200 wt. %.

(3) A glass-run channel comprising the laminated material according to the above (1) or (2).

(4) A roof molding, side molding or window molding for automobiles comprising the laminated material according to the above (1) or (2).

The present invention is explained in detail hereinafter.

In the laminated material of the present invention, the surface layer comprises a polyolefinic thermoplastic elastomer(A) containing an oily softening agent, and it is possible to improve the scratch resistance of the surface by blending an organopolysiloxane or the like where deemed necessary. Further, the underlayer of the laminated material of the present invention comprises a polyolefinic thermoplastic elastomer(B) containing an oily softening agent.

The laminated material of the present invention may be manufactured, for example, by melting the surface layer material and the underlayer material with heat not lower than the melting point of each material using two extruders and by forming a co-extrusion two-layer laminate. Further, it is possible to manufacture the laminated material by applying heat not lower than the melting points of these materials and by subjecting to the two-color injection.

In the laminated material of the present invention, the polyolefinic thermoplastic elastomer(A) forming the surface layer and the polyolefinic thermoplastic elastomer(B) forming the underlayer are at least composed of a polyolefin resin, an olefinic rubber having as the major part an ethylene-α-olefin-non-conjugated polyene copolymer rubber consisting of ethylene, an α-olefin having 3 to 20 carbon atoms and a non-conjugated polyene, and an oily softening agent.

The above polyolefinic thermoplastic elastomer(A) and the polyolefinic thermoplastic elastomer(B) forming the underlayer may be manufactured by dynamically heat treating, in the presence of a crosslinking agent, preferably 10 to 60 wt. Parts of a polyolefin resin(X), 30 to 70 wt. parts of an ethylene-α-olefin-non-conjugated polyene copolymer rubber(Y)(or a rubber component obtained by adding thereto other rubbers such as polyisobutylene, butyl rubber and propylene-ethylene copolymer) and 5 to 50 wt. parts of an oily softening agent(Z)[the total of (X), (Y) and (Z) being 100 wt. parts.]

Polyolefin Resin(X)

The raw material olefin of the polyolefin resin (X) used in the present invention includes, concretely, ethylene, propylene, 1-butene, 1-pentene, 1-hexene, 1-octene, 1-decene, 2-methyl-1-propene, 3-methyl-1-pentene, 4-methyl-1-pentene and 5-methyl-1-hexene. These olefins may be used alone or as a mixture of two or more. The polymerization mode may be random or block mode.

These polyolefin resins can be used alone or in a combination of two or more, but the polyolefin resin used in the polyolefinic thermoplastic elastomer(A) forming the surface layer preferably has as the major part a polypropylene (propylene homopolymer).

The MFR(230° C., load 2.16 kg) of the polyolefin resin used in the present invention is usually 0.1 to 50 g/10 min., preferably 1 to 30 g/10 min.

In the present invention, the polyolefin resin(X) is usually used in a ratio of 10 to 60 wt. parts to the total 100 wt. parts of the polyolefin resin(X), ethylene-α-olefin-non-conjugated copolymer rubber(Y) and oily softening agent (Z).

Ethylene-α-Olefin-Non-Conjugated Polyene Copolymer Rubber(Y)

The ethylene-α-olefin-non-conjugated polyene copolymer rubber(Y) used in the present invention is obtained by random copolymerization of ethylene, an α-olefin having 3 to 20 carbon atoms and a non-conjugated polyene in the presence of a suitable catalyst such as metallocene catalyst, titanium non-metallocene catalyst and vanadium catalyst.

The ethylene-α-olefin-non-conjugated polyene copolymer rubber(Y) may have a molecular structure of either of straight chain or branched long chain type.

The examples of the above-mentioned α-olefin having 3 to 20 carbon atoms are propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene, 12-ethyl-1-tetradecene and combinations of these.

Of these, as the α-olefin constituting a straight chain type ethylene-α-olefin-non-conjugated polyene copolymer rubber, preferable is an α-olefin having 4 to 10 carbon atoms, and particularly 1-butene, 1-hexene, 1-octene and 1-decene are preferably used. Further, as the α-olefin constituting a branched long chain type ethylene-α-olefin-non-conjugated polyene copolymer rubber, preferable is an α-olefin having 3 to 10 carbon atoms, and particularly propylene, 1-butene, 1-hexene and 1-octene are preferably used.

The non-conjugated polyene constituting the ethylene-α-olefin-non-conjugated polyene copolymer rubber includes, illustratively, aliphatic polyenes, alicyclic polyenes and aromatic polyenes.

The above-mentioned aliphatic polyene includes, concretely, 1,4-hexadiene, 1,5-hexadiene, 1,6-heptadiene, 1,6-octadiene, 1,7-octadiene, 1,8-nonadiene, 1,9-decadiene, 1,13-tetradecadiene, 3-methyl-1,4-hexadiene, 4-methyl-1,4-hexadiene, 5-methyl-1,4-hexadiene, 4-ethyl-1,4-hexadiene, 3-methyl-1,5-hexadiene, 3,3-dimethyl-1,4-hexadiene, 3,4-dimethyl-1,5-hexadiene, 5-methyl-1,4-heptadiene, 5-ethyl-1,4-heptadiene, 5-methyl-1,5-heptadiene, 6-methyl-1,5-heptadiene, 5-ethyl-1,5-heptadiene, 3-methyl-1,6-heptadiene, 4-methyl-1,6-heptadiene, 4,4-dimethyl-1,6-heptadiene, 4-methyl-1,6-heptadiene, 1,6-octadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 6-methyl-1,6-octadiene, 7-methyl-1,6-octadiene, 6-ethyl-1,6-octadiene, 6-propyl-1,6-octadiene, 6-butyl-1,6-octadiene, 4-methyl-1,4-nonadiene, 5-methyl-1,4-nonadiene, 4-ethyl-1,4-nonadiene, 5-ethyl-1,4-nonadiene, 5-methyl-1,5-nonadiene, 6-methyl-1,5-nonadiene, 5-ethyl-1,5-nonadiene, 6-ethyl-1,5-nonadiene, 6-methyl-1,6-nonadiene, 7-methyl-1,6-nonadiene, 6-ethyl-1,6-nonadiene, 7-ethyl-1,6-nonadiene, 7-methyl-1,7-nonadiene, 8-methyl-1,7-nonadiene, 7-ethyl-1,7-nonadiene, 5-methyl-1,4-decadiene, 5-ethyl-1,4-decadiene, 5-methyl-1,5-decadiene, 6-methyl-1,5-decadiene, 5-ethyl-1,5-decadiene, 6-ethyl-1,5-decadiene, 6-methyl-1,6-decadiene, 6-ethyl-1,6-decadiene, 7-methyl-1,6-decadiene, 7-ethyl-1,6-decadiene, 7-methyl-1,7-decadiene, 8-methyl-1,7-decadiene, 7-ethyl-1,7-decadiene, 8-ethyl-1,7-decadiene, 8-methyl-1,8-decadiene, 9-methyl-1,8-decadiene, 8-ethyl-1,8-decadiene, 6-methyl-1,6-undecadiene and 9-methyl-1,8-undecadiene.

The above-mentioned alicyclic polyene includes, concretely, vinylcyclohexene, vinylnorbornene, methylenenorbornene, ethylidenenorbornene(for example, 5-ethylidene-2-norbornene), dicyclopentadiene, cyclooctadiene, 2,5-norbornadiene, 1,4-divinylcyclohexane, 1,3-divinylcyclohexane, 1,3-divinylcyclopentane, 1,5-divinylcyclooctane, 1-allyl-4-vinylcyclohexane, 1,4-diallylcyclohexane, 1-allyl-5-vinylcyclooctane, 1,5-diallylcyclooctane, 1-allyl-4-isopropenylcyclohexane, 1-isopropenyl-4-vinylcyclohexane and 1-isopropenyl-3-vinylcyclopentane.

The examples of the above aromatic polyene include divinylbenzene and vinylisopropenylbenzene.

Of these, a non-conjugated polyene having 7 or more carbon atoms is preferable, and methyloctadiene such as 7-methyl-1,6-octadiene, ethylidene norbornene such as 5-ethylidene-2-norbornene, dicyclopentadiene and the like are preferably used. These non-conjugated polyenes can be used alone or in a combination of two or more.

The straight chain ethylene-α-olefin-non-conjugated polyene copolymer rubber(Y) preferably used in the present invention (hereinafter referred to as "copolymer rubber(Y)") has the following characteristics.

(1)Ethylene/α-Olefin Component Ratio

The copolymer rubber(Y) has the unit (a) derived from ethylene and the unit (b) derived from α-olefin of 3 to 20 carbon atoms (hereinafter sometimes simply called "α-olefin") in a molar ratio of 40/60 to 95/5, preferably 40/60 to 90/10, more preferably 50/50 to 85/15 [(a)/(b)].

The ethylene-α-olefin-non-conjugated polyene copolymer rubber having such an ethylene/α-olefin component ratio is excellent in both of low temperature flexibility and heat resistance.

(2)Iodine Value

The iodine value, an index of the non-conjugated polyene content in the copolymer rubber(Y), is 1 to 50, preferably 1 to 30.

(3)Intrinsic Viscosity[η]

The intrinsic viscosity[η] of the copolymer rubber(Y) measured in decalin at 135° C. is 0.1 to 10, preferably 1.5 to 7 dl/g.

The straight chain or branched long chain copolymer rubber(Y) mentioned above is manufactured by random copolymerization of ethylene, an α-olefin having 3 to 20 carbon atoms and a non-conjugated polyene in the presence of a suitable catalyst such as metallocene catalyst, titanium non-metallocene catalyst and vanadium catalyst.

The metallocene catalyst includes those described in, for example, JP-A-9-12790 and JP-A-9-137001.

The catalyst used for manufacturing the copolymer rubber (Y) is not limited to the metallocene catalyst. There may be used other metallocene catalysts, V-group transition metal compound catalysts such as vanadium catalyst, and titanium non-metallocene catalysts.

The vanadium catalyst includes for example the catalysts described in JP-A-64(1989)-54010, concretely, $VOCl_2(OC_2H_5)$ and $VOCl_3$, and there can be used combinations of these and organic aluminum compounds such as dialkylaluminum halide(e.g., diethylaluminum chloride). The titanium non-metallocene catalyst includes the catalysts described for example in JP-A-2-84404.

The copolymerization of ethylene, an α-olefin having 3 to 20 carbon atoms and a non-conjugated polyene can be conducted under the conditions of usually 40 to 200° C., preferably 50 to 150° C., particularly 60 to 120° C. and atmospheric pressure to 100 kg/cm², preferably atmospheric pressure to 50 kg/cm², particularly atmospheric pressure to 30 kg/cm².

The copolymerization reaction may be carried out by a variety of polymerization methods, preferably by solution polymerization.

The copolymerization may be carried out in a batch, semi-continuous or continuous mode, preferably in a continuous mode. Further, the copolymerization may be carried out in two or more steps with different polymerization conditions from each other.

The ethylene-α-olefin-non-conjugated polyene copolymer rubber (Y) is obtained by the aforementioned method wherein the molecular weight of the copolymer rubber (Y) may be controlled by changing the polymerization conditions, such as polymerization temperature, and also by controlling the amount of hydrogen used as a molecular weight controlling agent.

Among the ethylene-α-olefin-non-conjugated polyene copolymer rubber(Y), particularly ethylene-propylene-5-ethylidene-2-norbornene copolymer rubber is preferable because it gives a thermoplastic elastomer excellent in heat resistance, tensile properties and elasticity.

As the ethylene-α-olefin-non-conjugated polyene copolymer rubber(Y) generally used are a copolymer rubber having a Mooney viscosity ML 1+4 (100° C.) (non-oil extended condition) of about 50 to 250.

The thermoplastic elastomer used in the present invention can incorporate, as the rubber component(Y), other rubbers such as polyisobutylene, butyl rubber and propylene-ethylene copolymer in addition to the ethylene-α-olefin-non-conjugated polyene copolymer rubber.

In the present invention, the ethylene-α-olefin-non-conjugated polyene copolymer rubber(Y) (or a rubber component obtained by adding thereto other rubbers such as polyisobutylene, butyl rubber and propylene-ethylene copolymer) is used in a ratio of usually 30 to 70 wt. parts, preferably 40 to 60 wt. parts to the total 100 wt. parts of polyolefin resin(X), ethylene-α-olefin-non-conjugated polyene copolymer rubber(Y) and oily softening agent(Z). The formulation amount of other rubbers such as polyisobutylene, butyl rubber and propylene-ethylene copolymer is preferably 20 wt. parts or less to the total 100 wt. parts of polyolefin resin(X), ethylene-α-olefin-non-conjugated polyene copolymer rubber(Y) and oily softening agent(Z).

Oily Softening Agent(Z)

Here, the oily softening agent indicates a compound which is compatible with the ethylene-α-olefin-non-conjugated polyene copolymer rubbers or other rubbers such as polyisobutylene, butyl rubber and propylene-ethylene copolymer and which has an effect to decrease their viscosity, and includes, concretely, petroleum softening agents, such as process oil, lubricating oil, paraffin oil, liquid paraffin, petroleum asphalt and vaseline; coal tar softening agents, such as coal tar and coal tar pitch; fatty oil softening agents, such as castor oil, linseed oil, rape oil, soybean oil and coconut oil; tall oil; rubber substitute (factice); waxes, such as beeswax, carnauba wax and lanolin; fatty acids, such as ricinolic acid, palmitic acid and stearic acid; naphthenic acid; pine oil, rosin and their derivatives; ester softening agents, such as dioctyl phthalate, dioctyl adipate and dioctyl sebacate; microcrystalline wax; liquid polybutadiene; modified liquid polybutadiene; liquid Thiokol™; and hydrocarbon synthetic lubricating oils.

In the present invention, the oily softening agent(Z) is used in a ratio of usually 5 to 50 wt. parts to the total 100 wt. parts of the polyolefin resin(X), ethylene-α-olefin-non-conjugated polyene copolymer rubber (Y) and oily softening agent(Z).

Other Components

The thermoplastic elastomer used in the present invention may incorporate, other than the polyolefin resin (X), ethylene-α-olefin-non-conjugated polyene copolymer rubber(Y) and oily softening agent(Z), an organopolysiloxane, slipping agent and softening agent other than the above-mentioned oily softening agent and/or inorganic filler, where deemed necessary.

The illustrative examples of the organopolysiloxane include a single compound or a mixture of two or more of dimethylpolysiloxane, methylphenylpolysiloxane, methylhydrogenpolysiloxane or the like and modified polysiloxanes such as epoxy-, alkyl-, amino-, carboxyl-, alcohol-, fluorine-, alkylaralkylpolyether-, epoxypolyether- and polyether-modified polysiloxane.

The illustrative examples of the slipping agent are fatty acid, fatty acid amide, fatty acid ester, glycerin and wax.

The examples of the softening agent other than the above-mentioned oily softening agent are fatty acid salts such as barium stearate, calcium stearate and zinc laurate and synthetic polymeric substances such as terpene resin, petroleum resin, atactic polypropylene and coumaroneindene resin.

The inorganic filler includes, concretely, calcium carbonate, calcium silicate, carbon black, clay, kaolin, talc, silica, diatomaceous earth, mica powder, asbestos, alumina, barium sulfate, aluminum sulfate, calcium sulfate, basic magnesium carbonate, molybdenum disulfide, graphite, glass fiber, glass balloon, shirasu balloon, basic magnesium sulfate whisker, calcium titanate whisker and aluminum borate whisker.

In the present invention the oily softening agent(Z) may be added at the time of manufacturing the thermoplastic elastomer or may be oil-extended in advance in the ethylene-α-olefin-non-conjugated polyene copolymer rubber(Y). The method for oil extension can be a widely known method. For example, the method includes one of achieving the oil extension by mechanically blending an ethylene-α-olefin-non-conjugated polyene copolymer rubber(Y) and oily softening agent(Z) using an equipment such as roll or Bumbury's mixer or one wherein a given amount of an oily softening agent(z) is added in the solution of an ethylene-α-olefin-non-conjugated polyene copolymer rubber(Y) and thereafter the solvent is removed by steam stripping, etc.

Further, the thermoplastic elastomer used in the present invention can contain heretofore known heat stabilizers, age resistors, weather resisting agents, anti-static agents, metal soaps and lubricants such as wax in such a range not to damage the object of the present invention.

The thermoplastic elastomer used in the present invention is obtained by dynamically heat treating and crosslinking a mixture in the presence of a crosslinking agent, preferably an organic peroxide mentioned below, which mixture comprises the polyolefin resin(X), ethylene-α-olefin-non-conjugated polyene copolymer rubber(Y), oily softening agent(Z), and organopolysiloxane, slipping agent, softening agent other than the above oily softening agent and/or inorganic filler incorporated where deemed necessary. Herein, "dynamically heat treating" means kneading in the molten state.

Further, in the present invention, in manufacturing the thermoplastic elastomer, additional polyolefin resin(X) and/ or oily softening agent(Z) can be mixed to the material dynamically heat treated as mentioned above.

The organic peroxide used in the present invention includes, concretely, dicumyl peroxide, di-tert-butyl peroxide, 2,5-dimethyl-2,5-di-(tert-butylperoxy)hexane, 2,5-dimethyl-2,5-di-(tert-butylperoxy)hexyne-3, 1,3-bis(tert-butylperoxyisopropyl)benzene, 1,1-bis(tert-butylperoxy)-3,3,5-trimethylcyclohexane, n-butyl-4,4-bis(tert-butylperoxy)valerate, benzoyl peroxide, p-chlorobenzoyl peroxide, 2,4-dichlorobenzoyl peroxide, tert-butyl peroxybenzoate, tert-butylperoxyisopropylcarbonate, diacetyl peroxide, lauroyl peroxide and tert-butyl cumyl peroxide.

Such organic peroxides are used in an amount to make usually 0.05 to 1 wt. part, preferably 0.1 to 0.5 wt. part to 100 wt. parts of the whole to be treated, namely, the total of the polyolefin resin(X), ethylene-α-olefin-non-conjugated polyene copolymer rubber(Y), oily softening agent(Z) and other rubbers such as polyisobutylene, butyl rubber and propylene-ethylene copolymer rubber formulated where deemed necessary.

Moreover, as the crosslinking agent a phenol resin can be used. In this case, the amount of the phenol resin used is usually 1 to 20 wt. parts, preferably 2 to 15 wt. parts, more preferably 3 to 12 wt. parts to 100 wt. parts of the whole to be treated, namely, the total of the polyolefin resin(X), ethylene-α-olefin-non-conjugated polyene copolymer rubber(Y), oily softening agent(Z) and other rubbers such as polyisobutylene, butyl rubber and propylene-ethylene copolymer rubber formulated where deemed necessary.

In the present invention, upon crosslinking treatment by the organic peroxides, there can be incorporated peroxy crosslinking aids such as sulfur, p-quinone dioxime, p,p'-dibenzoylquinone dioxime, N-methyl-N-4-dinitrosoaniline, nitrosobenzene, diphenylguanidine and trimethylolpropane-N,N'-m-phenylene dimaleimide, or divinylbenzene, triallyl cyanurate, polyfunctional methacrylate monomers such as ethylene glycol dimethacrylate, diethylene glycol dimethacrylate, polyethylene glycol dimethacrylate, trimethylolpropane trimethacrylate and allyl methacrylate, and polyfunctional vinyl monomers such as vinyl butyrate and vinyl stearate.

To accelerate the decomposition of the organic peroxide, there can be used such decomposition accelerators as tertiary amines such as triethylamine, tributylamine and 2,4,6-tri(dimethylamino)phenol and naphthenates of aluminum, cobalt, vanadium, copper, calcium, zirconium, manganese, magnesium, lead and mercury.

The dynamic heat treatment in the present invention is preferably conducted using a twin screw extruder and under the atmosphere of inert gas such as nitrogen and carbon dioxide.

In the present invention, that a thermoplastic elastomer is crosslinked means the case where the gel content measured by the following method is in the range of preferably 20 wt. % or more, more preferably 45 wt. % or more.

Measurement of Gel Content:

A thermoplastic elastomer composition sample 100 mg is taken, cut into small pieces of 0.5 mm×0.5 mm×0.5 mm, dipped in 30 ml cyclohexane in a closed container at 23° C. for 48 hours, then taken out on a filter paper and dried at room temperature for 72 hours or more until a constant weight is obtained. From the weight of the residue after drying there are subtracted the weight of all the cyclohexane insoluble components (fibrous filler, filler, pigment, etc.) other than the polymer component and the weight of the crystalline polyolefin resin(A) in the sample before cyclohexane immersion. The value obtained thus is named "corrected final weight (Y)".

On the other hand, the weight of the ethylene-α-olefin-non-conjugated polyene copolymer rubber(Y) in the sample is named "corrected initial weight(X)".

The gel content is obtained by the following formula.

Gel content[wt. %]=[corrected final weight($Y$)/corrected initial weight($X$)]×100.

Method for Manufacturing Thermoplastic Elastomer(A)

A preferable method for manufacturing the thermoplastic elastomer(A) is explained below. The thermoplastic elastomer is obtained after partial crosslinking by dynamic heat treatment. The partial crosslinking by dynamic heat treatment is performed by kneading under the molten state, with an organic peroxide of usually 0.05 to 1.0 wt. part, preferably 0.1 to 0.5 wt. part added to 100 wt. parts of the whole to be treated, using various kneading equipment, at a temperature to make the half life of the used organic peroxide a time less than one minute, for example at 150 to 280° C., preferably at about 170 to 240° C., for about 1 to 20 minutes, preferably about 2 to 10 minutes.

The thermoplastic elastomer(A), in order that it may form the surface layer of good appearance at the time of extrusion, has a MFR(230° C., load 2.16 kg) of usually 0.1 to 100, preferably 1 to 50.

The thermoplastic elastomer(A), in order for it to form the surface layer of good appearance at the time of injection molding, may have a MFR(230° C., load 2.16 kg) of usually 0.1 to 100, preferably 1 to 50.

Method for Manufacturing Thermoplastic Elastomer(B)

A preferable method for manufacturing the thermoplastic elastomer(B) is explained below. The thermoplastic elastomer is obtained after partial crosslinking by dynamic heat treatment. The partial crosslinking by dynamic heat treatment is carried out by kneading under the molten state, with an organic peroxide of usually 0.05 to 1.0 wt. part, preferably 0.1 to 0.5 wt. part added to 100 wt. parts of the whole to be treated, using various kneading equipment, at a temperature to make the half life of the used organic peroxide at a time shorter than one minute, for example at 150 to 280° C., preferably at about 170 to 240° C., for about 1 to 20 minutes, preferably about 2 to 10 minutes.

The thermoplastic elastomer(B) may have a MFR (230° C., load 10 kg) of usually 5 to 100, preferably 10 to 50 for it to be extrusion molded.

The thermoplastic elastomer(B) may have a MFR(230° C., load 2.16 kg) of usually 0.1 to 100, preferably 1 to 50 for it to be injection molded.

In the laminated material of the present invention, to prevent the generation of stickiness on the surface layer, the ratio(a) of the oily softening agent to the amorphous component (or to the total of the amorphous component and polyethylene if polyethylene is incorporated)in the thermoplastic elastomer(A) and the ratio(b) of the oily softening agent to the amorphous component (or to the total of the amorphous component and polyethylene if polyethylene is incorporated) in the thermoplastic elastomer(B) must satisfy the following requisites;

ratio(a)≧ratio(b), ratio(a)=5 to 200 wt. %, and ratio(b)=5 to 200 wt. %.

Further, it is preferable that, in the laminated material of the present invention, the polyolefinic thermoplastic elastomer (A) and/or the polyolefinic thermoplastic elastomer(B) contain(s) polyethylene and in addition the ratio(a') of the oily softening agent to the amorphous component in the thermoplastic elastomer(A) and the ratio(b') of the oily softening agent to the amorphous component in the thermoplastic elastomer(B) satisfy the following requisites;

ratio(a')≧0.8×ratio(b'), ratio(a')=5 to 200 wt. %, and ratio(b')=5 to 200 wt. %.

Any of the above-mentioned ratio(a), ratio(b), ratio(a') and ratio (b') is preferably in the range of 5 to 150 wt. percent.

The amorphous component mentioned above indicates the total quantity of the ethylene-α-olefin-non-conjugated polyene copolymer rubber(Y), which is a rubber component in the thermoplastic elastomer(A) or thermoplastic elastomer(B), and the oily softening agent(Z). Further, when there is incorporated a hydrocarbon type rubbery material that is not crosslinked with peroxide, such as polyisobutylene, butyl rubber and propylene-ethylene copolymer, the amorphous component indicates the total quantity obtained by adding these amounts.

The thermoplastic elastomer laminated material of the present invention does not cause change in the surface nor generate stickiness even if exposed to high temperatures.

The laminated material of the present invention is applied for glass-run channels, and roof moldings, side moldings and window moldings of automobiles.

This specification includes part or all of the contents as disclosed in the specification of Japanese Patent Application No. 11(1999)-249957, which is the base of the priority claim of the present application.

DETAILED DESCRIPTION OF THE PREFERRED EMBODIMENTS

Hereinafter, the present invention is concretely explained by means of Preparation examples, Examples and Comparative examples, but these are not to be considered as limiting the scope of the present invention. In the following, the unit of formulations is weight unit unless otherwise specified.

Further, the method of the property measurement conducted in Examples and Comparative examples is as follows.

(Stickiness Test)

The generation of stickiness of the surface layer was observed after a specimen was left standing for 400 hours in an oven of 80° C.

PREPARATION EXAMPLE 1

Manufacture of Thermoplastic Elastomer(a)

A thermoplastic elastomer(a) (hereinafter referred to as "TPO-a") was prepared as in the following.

In a Bumbury's mixer there were placed 48 wt. parts of ethylene-propylene-5-ethylidene-2-norbornene copolymer rubber [ethylene/propylene(molar ratio)=4/1, iodine value= 13, intrinsic viscosity[η] measured in decalin at 135° C.=3.3 dl/g, Mooney viscosity ML 1+4 (100° C.) (non-oil extended state)=150] (hereinafter referred to as "EPDM"), 32 wt. parts of petroleum softening agent (paraffinic process oil made by Idemitsu Kosan Co. Ltd., trade name; Diana Process PW-380) and 20 wt. parts of propylene homopolymer (MFR 10 g/10 min.). The mixture was kneaded at 180° C. for 7 minutes, formed into a sheet through an open roll and cut with a sheet cutter to obtain square pellets. Then the square pellets were added with 0.27 wt. part of an organic peroxide [2,5-dimethyl-2,5-di-(tert-butylperoxy)hexane]and 0.4 wt. part of divinylbenzene(DVB), fully mixed in a Henschel mixer and thereafter fed to a twin-screw extruder to subject to the dynamic heat treatment according to the condition mentioned below to obtain the pellets of a thermoplastic elastomer (a).

Temperature setting at the die exit of twin-screw extruder: 210° C.

Screw diameter of twin-screw extruder: 50 mm

Extrusion amount: 40 kg/hr.

PREPARATION EXAMPLE 2

Manufacture of Thermoplastic Elastomer(b)

A thermoplastic elastomer(b) (hereinafter referred to as "TPO-b") was prepared in the same manner as Preparation example 1 except that the amounts used of the EPDM, petroleum softening agent and propylene homopolymer were changed to those shown in Table 1.

PREPARATION EXAMPLE 3

Manufacture of Thermoplastic Elastomer(c)

A thermoplastic elastomer(c) (hereinafter referred to as "TPO-c") was prepared in the same manner as Preparation example 1 except that the amounts used of the EPDM, petroleum softening agent and propylene homopolymer were changed to those shown in Table 1.

The compositions of TPO-a, TPO-b and TPO-c manufactured in Preparation examples 1 to 3 are shown in Table 1.

TABLE 1

| | EPDM α | Softening agent β | PE γ | PP δ | Total amount α + β + γ + δ | Softening agent concentration | |
|---|---|---|---|---|---|---|---|
| | | | | | | vs. amorphous component β/(α + β) | vs. amorphous component + PE β/(α + β + γ) |
| TPO-a | 48 | 32 | 0 | 20 | 100 | 40.0 | 40.0 |
| TPO-b | 56 | 24 | 0 | 20 | 100 | 30.0 | 30.0 |
| TPO-c | 64 | 16 | 0 | 20 | 100 | 20.0 | 20.0 |

EXAMPLE 1

TPO-b, in order to make the underlayer(B), was formed on the surface layer(A) which comprises 70 wt. % of TPO-a, 27.5 wt. % of a propylene homopolymer (MFR 10 g/10 min., the same applies hereinafter) and 2.5 wt. % of an organopolysiloxane(viscosity about 1,000,000 cSt, the same applies hereinafter), and the stickiness test was conducted regarding to the laminated material. There was perceived no generation of stickiness on the surface layer(A). The concentration of the petroleum softening agent to the amorphous component of the surface layer(A) at that time was 40 wt. % and that to the total of the amorphous component and polyethylene was 40 wt. %. The concentrations of the petroleum softening agent in TPO-b of the underlayer were 30 wt. % and 30 wt. %, respectively.

EXAMPLE 2

As to the laminated material in which the surface layer(A) comprises 70 wt. % of TPO-b, 27.5 wt. % of a propylene homopolymer and 2.5 wt. % of an organopolysiloxane and the underlayer (B) comprises TPO-b, the stickiness test was conducted. There was perceived no generation of stickiness on the surface layer(A). The concentration of the petroleum softening agent to the amorphous component of the surface layer(A) at that time was 30 wt. % and that to the total of the amorphous component and polyethylene was 30 wt. %. The concentrations of the petroleum softening agent in TPO-b of the underlayer were 30 wt. % and 30 wt. %, respectively.

EXAMPLE 3

TPO-c was formed so as to make the underlayer(B) on the surface layer(A) which comprises 70 wt. % of TPO-b, 27.5 wt. % of a propylene homopolymer and 2.5 wt. % of an organopolysiloxane, and the stickiness test was conducted on the laminated material. There was perceived no generation of stickiness on the surface layer(A). The concentration of the petroleum softening agent to the amorphous component of the surface layer(A) at that time was 30 wt. % and that to the total of the amorphous component and polyethylene was 30 wt. %. The concentrations of the petroleum softening agent in TPO-c of the underlayer were 20 wt. % and 20 wt. %, respectively.

EXAMPLE 4

TPO-b was formed so as to make the underlayer(B) on the surface layer(A) which comprises 70 wt. % of TPO-c, 27.5 wt. % of a propylene homopolymer, 2.5 wt. % of an organopolysiloxane and 20 wt. % of a post-addition petroleum softening agent, and the stickiness test was conducted for the laminated material. There was perceived no generation of stickiness on the surface layer(A). The concentration of the petroleum softening agent to the amorphous component of the surface layer(A) at that time was 41 wt. % and that to the total of the amorphous component and polyethylene was 41 wt. %. The concentrations of the petroleum softening agent in TPO-b of the underlayer were 30 wt. % and 30 wt. %, respectively.

COMPARATIVE EXAMPLE 1

TPO-a was formed so as to make the underlayer(B) on the surface layer(A) which comprises 70 wt. % of TPO-b, 27.5 wt. % of a propylene homopolymer and 2.5 wt. % of an organopolysiloxane, and the stickiness test was conducted for the laminated material. There was perceived generation of stickiness on the surface layer(A). The concentration of the petroleum softening agent to the amorphous component of the surface layer(A) at that time was 30 wt. % and that to the total of the amorphous component and polyethylene was 30 wt. %. The concentrations of the petroleum softening agent in TPO-a of the underlayer were 40 wt. % and 40 wt. %, respectively.

COMPARATIVE EXAMPLE 2

TPO-b was formed so as to make the underlayer(B) on the surface layer(A) which comprises 70 wt. % of TPO-b, 27.5 wt. % of a polyethylene(MFR 20, 190° C., load 2.16 kg) and 2.5 wt. % of an organopolysiloxane, and the stickiness test was conducted for the laminated material. There was perceived generation of stickiness on the surface layer(A). The concentration of the petroleum softening agent to the amorphous component of the surface layer(A) at that time was 30 wt. % and that to the total of the amorphous component and polyethylene was 20.1 wt. %. The concentrations of the petroleum softening agent in TPO-b of the underlayer were 30 wt. % and 30 wt. %, respectively.

COMPARATIVE EXAMPLE 3

TPO-a was formed so as to make the underlayer(B) on the surface layer(A) which comprises 70 wt. % of TPO-c, 27.5 wt. % of a propylene homopolymer and 2.5 wt. % of an organopolysiloxane, and the stickiness test was conducted for the laminated material. There was perceived generation of stickiness on the surface layer(A). The concentration of the petroleum softening agent to the amorphous component of the surface layer(A) at that time was 20 wt. % and that to the total of the amorphous component and polyethylene was 20 wt. %. The concentrations of the petroleum softening agent in TPO-a of the underlayer were 40 wt. % and 40 wt. %, respectively.

COMPARATIVE EXAMPLE 4

The stickiness test was conducted as to the laminated material wherein the surface layer(A) comprises 70 wt. % of TPO-c, 27.5 wt. % of a propylene homopolymer and 2.5 wt. % of an organopolysiloxane and the underlayer(B) comprises TPO-b. There was perceived generation of stickiness on the surface layer(A). The concentration of the petroleum softening agent to the amorphous component of the surface layer(A) at that time was 20 wt. % and that to the total of the amorphous component and polyethylene was 20 wt. %. The concentrations of the petroleum softening agent in TPO-b of the underlayer were 30 wt. % and 30 wt. %, respectively.

The amounts of each component used in Examples 1 to 4 and Comparative examples 1 to 4 and the results are shown in Table

TABLE 2

|  |  |  | Example | | | | Comparative example | | | |
|---|---|---|---|---|---|---|---|---|---|---|
|  |  |  | 1 | 2 | 3 | 4 | 1 | 2 | 3 | 4 |
| Surface layer (A) | Surface layer (A) formulation | TPO-a (wt %) | 70 | | | | | | | |
|  |  | TPO-b (wt %) | | 70 | 70 | | 70 | 70 | | |
|  |  | TPO-c (wt %) | | | | 70 | | | 70 | 70 |
|  |  | PP (wt %) | 27.5 | 27.5 | 27.5 | 27.5 | 27.5 | | 27.5 | 27.5 |
|  |  | PE (wt %) | | | | | | 27.5 | | |
|  |  | Organopoly-siloxane (wt %) | 2.5 | 2.5 | 2.5 | 2.5 | 2.5 | 2.5 | 2.5 | 2.5 |
|  |  | Softening agent post-addition (wt %) | | | | 20 | | | | |
|  | Softening agent concentration (wt %) | vs. amorphous component | 40 | 30 | 30 | 41 | 30 | 30 | 20 | 20 |
|  |  | vs. amorphous component + PE | 40 | 30 | 30 | 41 | 30 | 20.1 | 20 | 20 |

TABLE 2-continued

|  |  |  | Example | | | | Comparative example | | | |
| --- | --- | --- | --- | --- | --- | --- | --- | --- | --- | --- |
|  |  |  | 1 | 2 | 3 | 4 | 1 | 2 | 3 | 4 |
| Underlayer (B) | Formulation |  | TPO-b | TPO-b | TPO-c | TPO-b | TPO-a | TPO-b | TPO-a | TPO-b |
|  | Softening agent concentration (wt %) | vs. amorphous component | 30 | 30 | 20 | 30 | 40 | 30 | 40 | 30 |
|  |  | vs. amorphous component + PE | 30 | 30 | 20 | 30 | 40 | 30 | 40 | 30 |
| Generation of stickiness |  |  | No | No | No | No | Yes | Yes | Yes | Yes |

All the publications, patents and patent applications cited herein are incorporated herein by reference in their entirety.

What is claimed is:

1. A glass-run channel comprising:
   (i) a surface layer comprising a polyolefinic thermoplastic elastomer (A) manufactured by dynamically heat treating, in the presence of a crosslinking agent, 10 to 60 wt. parts of a polyolefin resin (X), 30 to 70 wt. parts of a rubber component (Y) comprising at least an ethylene-α-olefin-non-conjugated polyene copolymer rubber and 5 to 50 wt. parts of an oily softening agent (Z), the total of (X), (Y) and (Z) being 100 wt. parts, and
   (ii) an underlayer comprising a polyolefinic thermoplastic elastomer (B) manufactured by dynamically heat treating, in the presence of a crosslinking agent, 10 to 60 wt. parts of a polyolefin resin (X'), 30 to 70 wt. parts of a rubber component (Y') comprising at least an ethylene-α-olefin-non-conjugated polyene copolymer rubber and 5 to 50 wt. parts of an oily softening agent (Z'), the total of (X'), (Y') and (Z') being 100 wt. parts, which underlayer is laminated on the surface layer, wherein the ratio (a) of the oily softening agent (Z) to the total of the rubber component (Y) and the oily softening agent (Z), or if polyethylene is incorporated, to the total of the rubber component (Y), the oily softening agent (Z) and polyethylene in said thermoplastic elastomer (A) and the ratio (b) of the oily softening agent (Z') to the total of the rubber component (Y') and the oily softening agent (Z'), or if polyethylene is incorporated, to the total of the rubber component (Y'), the oily softening agent (Z') and polyethylene in said thermoplastic elastomer (B) satisfy the following requisite;
   ratio (a)≧ratio (b).

2. A glass-run channel according to claim 1, wherein the polyolefin resin (X) and/or the polyolefin resin (X') contain(s) polyethylene and in addition the ratio (a') of the oily softening agent (Z) to the total of the rubber component (Y) and the oily softening agent (Z) in said thermoplastic elastomer (A) and the ratio (b') of the oily softening agent (Z') to the total of the rubber component (Y') and the oily softening agent (Z') in said thermoplastic elastomer (B) satisfy the following requisite;
   ratio (a')≧0.8×ratio (b').

3. A roof molding comprising:
   (i) a surface layer comprising a polyolefinic thermoplastic elastomer (A) manufactured by dynamically heat treating, in the presence of a crosslinking agent, 10 to 60 wt. parts of a polyolefin resin (X), 30 to 70 wt. parts of a rubber component (Y) comprising at least an ethylene-α-olefin-non-conjugated polyene copolymer rubber and 5 to 50 wt. parts of an oily softening agent (Z), the total of (X), (Y) and (Z) being 100 wt. parts, and
   (ii) an underlayer comprising a polyolefinic thermoplastic elastomer (B) manufactured by dynamically heat treating, in the presence of a crosslinking agent, 10 to 60 wt. parts of a polyolefin resin (X'), 30 to 70 wt. parts of a rubber component (Y') comprising at least an ethylene-α-olefin-non-conjugated polyene copolymer rubber and 5 to 50 wt. parts of an oily softening agent (Z'), the total of (X'), (Y') and (Z') being 100 wt. parts, which underlayer is laminated on the surface layer, wherein the ratio (a) of the oily softening agent (Z) to the total of the rubber component (Y) and the oily softening agent (Z), or if polyethylene is incorporated, to the total of the rubber component (Y), the oily softening agent (Z) and polyethylene in said thermoplastic elastomer (A) and the ratio (b) of the oily softening agent (Z') to the total of the rubber component (Y') and the oily softening agent (Z'), or if polyethylene is incorporated, to the total of the rubber component (Y'), the oily softening agent (Z') and polyethylene in said thermoplastic elastomer (B) satisfy the following requisite;
   ratio (a)≧ratio (b).

4. A roof molding according to claim 3, wherein the polyolefin resin (X) and/or the polyolefin resin (X') contain(s) polyethylene and in addition the ratio (a') of the oily softening agent (Z) to the total of the rubber component (Y) and the oily softening agent (Z) in said thermoplastic elastomer (A) and the ratio (b') of the oily softening agent (Z') to the total of the rubber component (Y') and the oily softening agent (Z') in said thermoplastic elastomer (B) satisfy the following requisite;
   ratio (a')≧0.8×ratio (b').

5. A side molding comprising:
   (i) a surface layer comprising a polyolefinic thermoplastic elastomer (A) manufactured by dynamically heat treating, in the presence of a crosslinking agent, 10 to 60 wt. parts of a polyolefin resin (X), 30 to 70 wt. parts of a rubber component (Y) comprising at least an ethylene-α-olefin-non-conjugated polyene copolymer rubber and 5 to 50 wt. parts of an oily softening agent (Z), the total of (X), (Y) and (Z) being 100 wt. parts, and
   (ii) an underlayer comprising a polyolefinic thermoplastic elastomer (B) manufactured by dynamically heat treating, in the presence of a crosslinking agent, 10 to 60 wt. parts of a polyolefin resin (X'), 30 to 70 wt. parts of a rubber component (Y') comprising at least an ethylene-α-olefin-non-conjugated polyene copolymer rubber and 5 to 50 wt. parts of an oily softening agent (Z'), the total of (X'), (Y') and (Z') being 100 wt. parts, which underlayer is laminated on the surface layer, wherein the ratio (a) of the oily softening agent (Z) to the total of the rubber component (Y) and the oily softening agent (Z), or if polyethylene is incorporated, to the total of the rubber component (Y), the oily softening agent (Z) and polyethylene in said thermoplastic elastomer (A) and the ratio (b) of the oily softening agent (Z') to the total of the rubber component (Y') and the oily softening agent (Z'), or if polyethylene is incorporated, to the total of the rubber component (Y'), the oily softening agent (Z') and polyethylene in said thermoplastic elastomer (B) satisfy the following requisite;

ratio (a)≧ratio (b).

6. A side molding according to claim 5, wherein the polyolefin resin (X) and/or the polyolefin resin (X') contain(s) polyethylene and in addition the ratio (a') of the oily softening agent (Z) to the total of the rubber component (Y) and the oily softening agent (Z) in said thermoplastic elastomer (A) and the ratio (b') of the oily softening agent (Z') to the total of the rubber component (Y') and the oily softening agent (Z') in said thermoplastic elastomer (B) satisfy the following requisite;

ratio (a')≧0.8×ratio (b').

7. A window molding comprising:

(i) a surface layer comprising a polyolefinic thermoplastic elastomer (A) manufactured by dynamically heat treating, in the presence of a crosslinking agent, 10 to 60 wt. parts of a polyolefin resin (X), 30 to 70 wt. parts of a rubber component (Y) comprising at least an ethylene-α-olefin-non-conjugated polyene copolymer rubber and 5 to 50 wt. parts of an oily softening agent (Z), the total of (X), (Y) and (Z) being 100 wt. parts, and (ii) an underlayer comprising a polyolefinic thermoplastic elastomer (B) manufactured by dynamically heat treating, in the presence of a crosslinking agent, 10 to 60 wt. parts of a polyolefin resin (X'), 30 to 70 wt. parts of a rubber component (Y') comprising at least an ethylene-a-olefin-non-conjugated polyene copolymer rubber and 5 to 50 wt. parts of an oily softening agent (Z'), the total of (X'), (Y') and (Z') being 100 wt. parts, which underlayer is laminated on the surface layer, wherein the ratio (a) of the oily softening agent (Z) to the total of the rubber component (Y) and the oily softening agent (Z), or if polyethylene is incorporated, to the total of the rubber component (Y), the oily softening agent (Z) and polyethylene in said thermoplastic elastomer (A) and the ratio (b) of the oily softening agent (Z') to the total of the rubber component (Y') and the oily softening agent (Z'), or if polyethylene is incorporated, to the total of the rubber component (Y'), the oily softening agent (Z') and polyethylene in said thermoplastic elastomer (B) satisfy the following requisite;

ratio (a)≧ratio (b).

8. A window molding according to claim 7, wherein the polyolefin resin (X) and/or the polyolefin resin (X') contain(s) polyethylene and in addition the ratio (a') of the oily softening agent (Z) to the total of the rubber component (Y) and the oily softening agent (Z) in said thermoplastic elastomer (A) and the ratio (b') of the oily softening agent (Z') to the total of the rubber component (Y') and the oily softening agent (Z') in said thermoplastic elastomer (B) satisfy the following requisite;

ratio (a')≧0.8×ratio (b').

9. A method of using a laminated material comprising:

(i) a surface layer comprising a polyolefinic thermoplastic elastomer (A) manufactured by dynamically heat treating, in the presence of a crosslinking agent, 10 to 60 wt. parts of a polyolefin resin (X), 30 to 70 wt. parts of a rubber component (Y) comprising at least an ethylene-α-olefin-non-conjugated polyene copolymer rubber and 5 to 50 wt. parts of an oily softening agent (Z), the total of (X), (Y) and (Z) being 100 wt. parts, and (ii) an underlayer comprising a polyolefinic thermoplastic elastomer (B) manufactured by dynamically heat treating, in the presence of a crosslinking agent, 10 to 60 wt. parts of a polyolefin resin (X'), 30 to 70 wt. parts of a rubber component (Y') comprising at least an ethylene-α-olefin-non-conjugated polyene copolymer rubber and 5 to 50 wt. parts of an oily softening agent (Z'), the total of (X'), (Y') and (Z') being 100 wt. parts which underlayer is laminated on the surface layer, wherein the ratio (a) of the oily softening agent (Z) to the total of the rubber component (Y) and the oily softening agent (Z), or if polyethylene is incorporated, to the total of the rubber component (Y), the oily softening agent (Z) and polyethylene in said thermoplastic elastomer (A) and the ratio (b) of the oily softening agent (Z') to the total of the rubber component (Y') and the oily softening agent (Z'), or if polyethylene is incorporated, to the total of the rubber component (Y'), the oily softening agent (Z') and polyethylene in said thermoplastic elastomer (B) satisfy the following requisite;

ratio(a)≧ratio(b), which method comprises:

using the laminated material so that the surface layer comprising a polyolefinic thermoplastic elastomer (A) becomes a surface layer of A product; and producing the product wherein the product is selected from the group consisting of a glass-run channel, and a roof molding, side molding or window molding for automobiles.

* * * * *